United States Patent
Lacombe et al.

(10) Patent No.: US 7,868,603 B2
(45) Date of Patent: Jan. 11, 2011

(54) METHOD AND APPARATUS TO COMPENSATE FOR SUPPLY VOLTAGE VARIATIONS IN A PWM-BASED VOLTAGE REGULATOR

(75) Inventors: David K. Lacombe, Mission Viejo, CA (US); Chii-Fa Chiou, Lake Forest, CA (US); George C. Henry, Somis, CA (US)

(73) Assignee: Microsemi Corporation, Irvine, CA (US)

( * ) Notice: Subject to any disclaimer, the term of this patent is extended or adjusted under 35 U.S.C. 154(b) by 258 days.

(21) Appl. No.: 11/866,262

(22) Filed: Oct. 2, 2007

(65) Prior Publication Data

US 2008/0084196 A1    Apr. 10, 2008

Related U.S. Application Data

(60) Provisional application No. 60/849,254, filed on Oct. 4, 2006, provisional application No. 60/849,211, filed on Oct. 4, 2006.

(51) Int. Cl.
*G05F 1/46* (2006.01)
*G05F 1/575* (2006.01)

(52) U.S. Cl. .................................... 323/285
(58) Field of Classification Search ............ 323/282, 323/284, 285; 363/97, 98; 315/209, 219, 315/221

See application file for complete search history.

(56) References Cited

U.S. PATENT DOCUMENTS

| | | | |
|---|---|---|---|
| 5,912,549 A * | 6/1999 | Farrington et al. ........... 323/207 |
| 5,923,129 A | 7/1999 | Henry | |
| 5,930,121 A | 7/1999 | Henry | |
| 6,198,234 B1 | 3/2001 | Henry | |
| 6,198,236 B1 * | 3/2001 | O'Neill ................. 315/307 |
| 6,522,558 B2 | 2/2003 | Henry | |
| 6,556,067 B2 | 4/2003 | Henry | |
| 6,593,703 B2 * | 7/2003 | Sun ......................... 315/224 |
| 6,636,104 B2 | 10/2003 | Henry | |
| 6,784,750 B2 | 8/2004 | Chiou et al. | |
| 6,803,825 B2 | 10/2004 | Chiou et al. | |
| 6,812,776 B2 | 11/2004 | Henry | |
| 6,853,153 B2 * | 2/2005 | Gray .......................... 315/291 |
| 6,876,157 B2 | 4/2005 | Henry | |
| 6,897,709 B2 | 5/2005 | Henry | |
| 6,944,034 B1 * | 9/2005 | Shteynberg et al. ...... 363/21.13 |
| 6,969,958 B2 | 11/2005 | Henry | |
| 6,979,959 B2 | 12/2005 | Henry | |

(Continued)

Primary Examiner—Gary L Laxton
Assistant Examiner—Nusrat J Quddus
(74) Attorney, Agent, or Firm—Knobbe Martens Olson & Bear LLP

(57) ABSTRACT

A feed-forward correction circuit in a PWM controller adjusts an error signal inversely with respect to a supply voltage for a switching voltage regulator to quickly compensate for changes or transients in the supply voltage. The adjusted error signal is provided to a PWM comparator to control a duty cycle of an output signal. The switching voltage regulator can be a DC-to-DC converter or a DC-to-AC converter, and the output signal is used to generate one or more driving signals to control semiconductor switches in the switching voltage regulator. The feed-forward correction circuit uses an offset compensation technique or a translinear circuit to maintain a substantially inverse product relationship between the supply voltage and the duty cycle of the output signal, thereby reducing overshoots and undershoots in a regulated output voltage of the switching voltage regulator.

20 Claims, 12 Drawing Sheets

U.S. PATENT DOCUMENTS

| | | |
|---|---|---|
| 7,071,630 B1 * | 7/2006 | York .......................... 315/224 |
| 7,112,929 B2 | 9/2006 | Chiou |
| 7,183,727 B2 | 2/2007 | Ferguson et al. |
| 7,279,852 B2 | 10/2007 | Henry |
| 7,321,200 B2 | 1/2008 | Henry |
| 7,342,577 B2 * | 3/2008 | Struebel et al. ............. 345/204 |
| 2006/0126367 A1 * | 6/2006 | Hesterman ................... 363/89 |
| 2006/0158136 A1 * | 7/2006 | Chen .......................... 315/308 |
| 2007/0014130 A1 | 1/2007 | Chiou |
| 2007/0132398 A1 | 6/2007 | Ferguson et al. |

* cited by examiner

METHOD AND APPARATUS TO COMPENSATE FOR SUPPLY VOLTAGE VARIATIONS IN A PWM-BASED VOLTAGE REGULATOR

CLAIM FOR PRIORITY

This application claims the benefit of priority under 35 U.S.C. §119(e) of U.S. Provisional Application No. 60/849,211 entitled "Compensation for Supply Voltage Variations in a PWM" and U.S. Provisional Application No. 60/849,254 entitled "PWM Duty Cycle Inverse Adjustment Circuit," both filed on Oct. 4, 2006, the entirety of which is incorporated herein by reference.

BACKGROUND

1. Field of the Invention

The invention generally relates to a pulse width modulation (PWM) controller for a switching voltage regulator, and more particularly, relates to a feed-forward circuit that adjusts an output pulse width inversely with respect to a supply voltage to compensate for transients or changes in the supply voltage.

2. Description of the Related Art

A switching voltage regulator generally accepts a direct current (DC) supply voltage at a first level and generates a regulated output voltage at a second level. The second level can be higher or lower than the first level. Different sources, such as a battery or an alternating current (AC) adapter, can provide the DC supply voltage. The different sources can provide different DC supply voltage levels, and the DC supply voltage level can vary over time for the same source. In a PWM-based switching voltage regulator, the regulated output voltage tends to increase or decrease proportionally with an increase or a decrease in the DC supply voltage. A PWM controller for the switching voltage regulator typically includes a feedback loop that forces the regulated output voltage back to a nominal level. However, the feedback loop is relatively slow for stable operations and does not usually react fast enough to rapid changes (or transients) in the DC supply voltage to prevent overshoots or undershoots in the regulated output voltage.

A feed-forward circuit can be used to compensate for transients in the DC supply voltage. One type of feed-forward circuits provides compensation for changes in the DC supply voltage by changing a slope of a ramp signal in the PWM controller to force a change in a pulse width of a PWM output that controls the regulated output voltage level. There is generally significant delay in this type of pulse width correction since the slope of the ramp signal is generally controlled by a current charging a capacitor, and voltage across a capacitor cannot change instantaneously. For example, a practical PWM ramp generator uses a current source or resistor to charge a capacitor to produce a ramp voltage across the capacitor. The ramp voltage is compared with a control signal from an error amplifier to modulate a pulse width of a PWM output. Since the ramp voltage (i.e., the voltage across the capacitor) cannot change instantaneously when charging current changes, the ramp voltage cannot step instantaneously to follow and correct for a fast supply voltage transient. Correction may be delayed by a minimum of one half cycle and up to several cycles of the ramp voltage.

SUMMARY

In one embodiment, the present invention proposes a PWM controller that adjusts an error signal (or a PWM control signal) inversely with respect to a supply voltage to quickly compensate for changes or transients in the supply voltage. The PWM controller generates at least one output signal that drives one or more semiconductor switches in a switching voltage regulator. The switching voltage regulator receives the supply voltage and generates a regulated output voltage for a load. The regulated output voltage level depends on the supply voltage level and duty cycle (or pulse width) of the output signal from the PWM controller. The duty cycle of the output signal from the PWM controller is controlled in part by an error signal in a feedback loop. The ability to quickly adjust the error signal in response to transients in the supply voltage helps to maintain a substantially constant regulated output voltage without undesirable overshoots or undershoots caused by fluctuations or sudden changes in the supply voltage.

In one embodiment, the PWM controller includes an input terminal configured for receiving a feedback signal indicative of an output condition (e.g., an output voltage or a load current) for the switching voltage regulator. An error amplifier (e.g., a transconductance amplifier) generates an error signal based on a comparison of the feedback signal to a reference signal that indicates a desired output condition for the switching voltage regulator. A feed-forward circuit receives the error signal and a supply sensed signal indicative of a supply voltage level. The feed-forward circuit generates an adjusted error signal that has a substantially proportional relationship to the error signal and a substantially inverse relationship to the supply sensed signal. The adjusted error signal is provided to a first input terminal of a PWM comparator and a periodic ramp signal is provided to a second input terminal of the PWM comparator to generate a pulse-width modulated output signal. In one embodiment, the feed-forward circuit provides compensation for supply voltage variations quickly (e.g., within a half cycle of the periodic ramp signal or in nano-seconds) such that a product of the supply voltage level and duty cycle of the pulse-width modulated output signal is substantially constant from cycle-to-cycle for a given reference signal.

In one embodiment, the feed-forward circuit includes a voltage-controlled current source that generates an offset current to track changes in the supply voltage based on the supply sensed signal. The supply sensed signal can be the supply voltage itself. One way to implement the voltage-controlled current source is to couple a resistor between the supply voltage and a current mirror circuit. The current mirror circuit conducts the offset current, and a summing resistor coupled between an output of the error amplifier and an output of the current mirror circuit also conducts the offset current to generate an offset voltage. In one embodiment, the summing resistor has a first terminal DC-coupled to the output of the error amplifier and a second terminal coupled to the first input terminal of the PWM comparator. The error signal at the output of the error amplifier is effectively combined (or added) with the offset voltage across the summing resistor to generate the adjusted error signal at the second terminal of the summing resistor. In one embodiment, the adjusted error signal varies inversely with respect to the supply sensed signal to maintain a substantially constant regulated output voltage for a predetermined range of supply voltage levels.

In another embodiment, the feed-forward circuit includes a translinear circuit (e.g., a plurality of transistors arranged in a translinear configuration) to track the supply voltage and to quickly adjust the error signal in response to transients in the supply voltage. The translinear circuit conducts at least a first current signal, a second current signal and a third current signal. The first current signal is substantially proportional to a product of the second current signal and the third current signal. In one embodiment, the first current signal is derived from the error signal (e.g., using a first voltage-to-current converter), the second current signal is derived from the supply sensed signal (e.g., using a second voltage-to-current converter), and the third current signal is used to generate the adjusted error signal. Thus, the adjusted error signal is directly proportional to the error signal and inversely proportional to the supply sensed signal. The adjusted error signal generated by the translinear circuit is also able to reflect a change in the supply voltage level quickly (e.g., within a half cycle of the periodic ramp voltage).

In one embodiment, the switching voltage regulator is a DC-to-DC power converter (e.g., a buck or a boost converter) with an output voltage level that varies with the duty cycle of the pulse-width modulated output signal, and the feedback signal to the error amplifier indicates the output voltage level of the DC-to-DC power converter. In another embodiment, the switching voltage regulator is an inverter (or DC-to-AC power converter) with an output voltage amplitude that varies with the duty cycle of the pulse-width modulated output signal, and the feedback signal indicates current conducted by the load. One type of load is a cold cathode fluorescent lamp (CCFL) used in a backlight system to illuminate a display (e.g., a liquid crystal display), and the reference signal to the error amplifier can be controlled by a user to determine a desired brightness level for the CCFL.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

These drawings and the associated description herein are provided to illustrate embodiments and are not intended to be limiting.

DETAILED DESCRIPTION OF EMBODIMENTS

Although particular embodiments are described herein, other embodiments, including embodiments that do not provide all of the benefits and features set forth herein, will be apparent to those of ordinary skill in the art.

Figure 1:
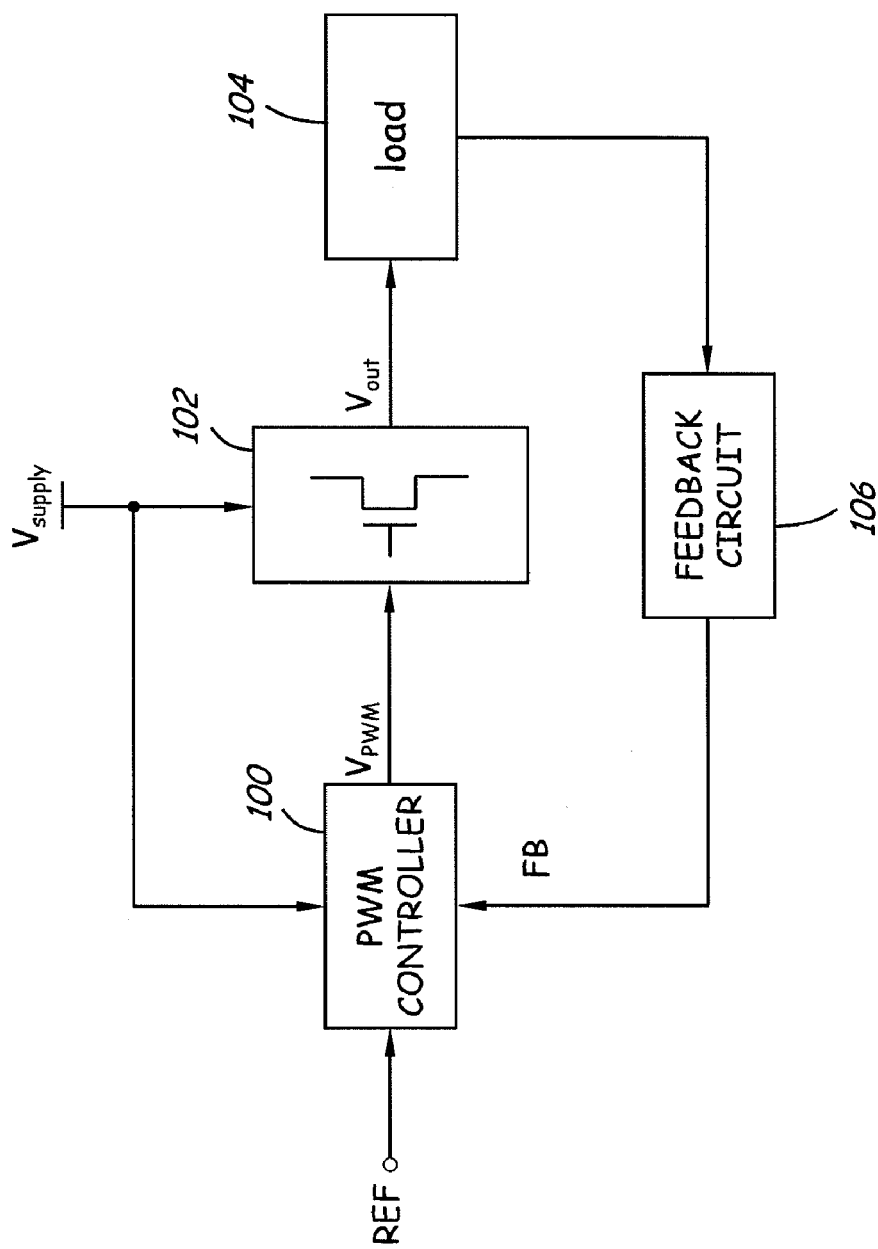
FIG. 1 is a block diagram of a switching voltage regulator according to one embodiment of the present invention.

FIG. 1 is a block diagram of a switching voltage regulator according to one embodiment of the present invention. The switching voltage regulator includes a switching circuit 102 configured to receive a supply voltage ($V_{supply}$) and to provide a regulated output voltage ($V_{out}$) to a load 104. A feedback circuit 106 senses an output condition to generate a feedback signal (FB) for a controller 100. In one embodiment, the controller 100 uses PWM techniques to generate one or more PWM driving signals ($V_{PWM}$) to control one or more semiconductor switches in the switching circuit 102. The level or amplitude of the regulated output voltage is proportional to a pulse width (or duty cycle) of the PWM driving signals. The controller 100 receives a reference signal (REF) indicating a desired level or amplitude for the regulated output voltage, and a regulator loop including a PWM circuit adjusts the duty cycle of the PWM driving signals based on a difference between the reference signal and the feedback signal to achieve the desired level or amplitude.

The level or amplitude of the regulated output voltage is also proportional to the supply voltage. It is desirable to maintain an inverse product relationship between the supply voltage and the duty cycle of the PWM driving signals to facilitate a steady regulated output voltage. In the embodiment shown in FIG. 1, the controller 100 receives a supply sensed signal indicating a supply voltage level and provides feed-forward compensation for variations in the supply voltage by adjusting the duty cycle of the PWM driving signals inversely with respect to the supply sensed signal.

In one embodiment, the controller 100 uses an offset compensation technique to quickly (e.g., instantaneously or within nano-seconds) reduce or increase the duty cycle of the PWM driving signals in response to changes in the supply sensed signal. For example, the supply voltage can be provided by different power sources (e.g., a battery, a battery charger or an AC adapter). The different power sources can have different ranges of supply voltage levels (e.g., an AC adapter generally outputs higher voltages that a battery). The supply voltage level can change suddenly when switching between different power sources while the switching voltage regulator is active. For example, most electronic devices automatically disconnect their batteries and use an AC adapter as a power source when the AC adapter is plugged in during usage. In addition, the supply voltage can fluctuate due to other reasons (e.g., noise or battery discharge)

The offset compensation technique allows the controller 100 to respond quickly to transient changes in the supply voltage, thereby reducing or preventing output voltage overshoots or transients in the regulated output voltage. In other words, the offset compensation technique maintains an approximately constant product of the supply voltage level and the duty cycle of the PWM driving signals to reduce overshoots and undershoots in the regulated output voltage. In another embodiment, the controller 100 uses a translinear circuit to achieve the approximately constant product of supply voltage level and the duty cycle of the PWM driving signals to maintain a substantially constant regulated output voltage. Both the offset compensation technique and the translinear circuit can also be used to correct for gradual changes in the supply voltage (e.g., a slow discharge of the battery during usage). The offset compensation technique and the translinear circuit are described below in further detail.

The switching voltage regulator in FIG. 1 can be a DC-to-DC power converter or a DC-to-AC power converter (e.g., an inverter). In some applications, an inverter is used to power CCFLs in a backlight system and maintaining the inverse product relationship between the supply voltage and the duty cycle of the PWM driving signals ensures that light intensity is approximately constant over a range of supply voltage levels (or applied battery voltages). In addition, maintaining the inverse product relationship in response to transients (or rapid changes) in the supply voltage prevents undesirable lamp flicker.

Figure 2A:
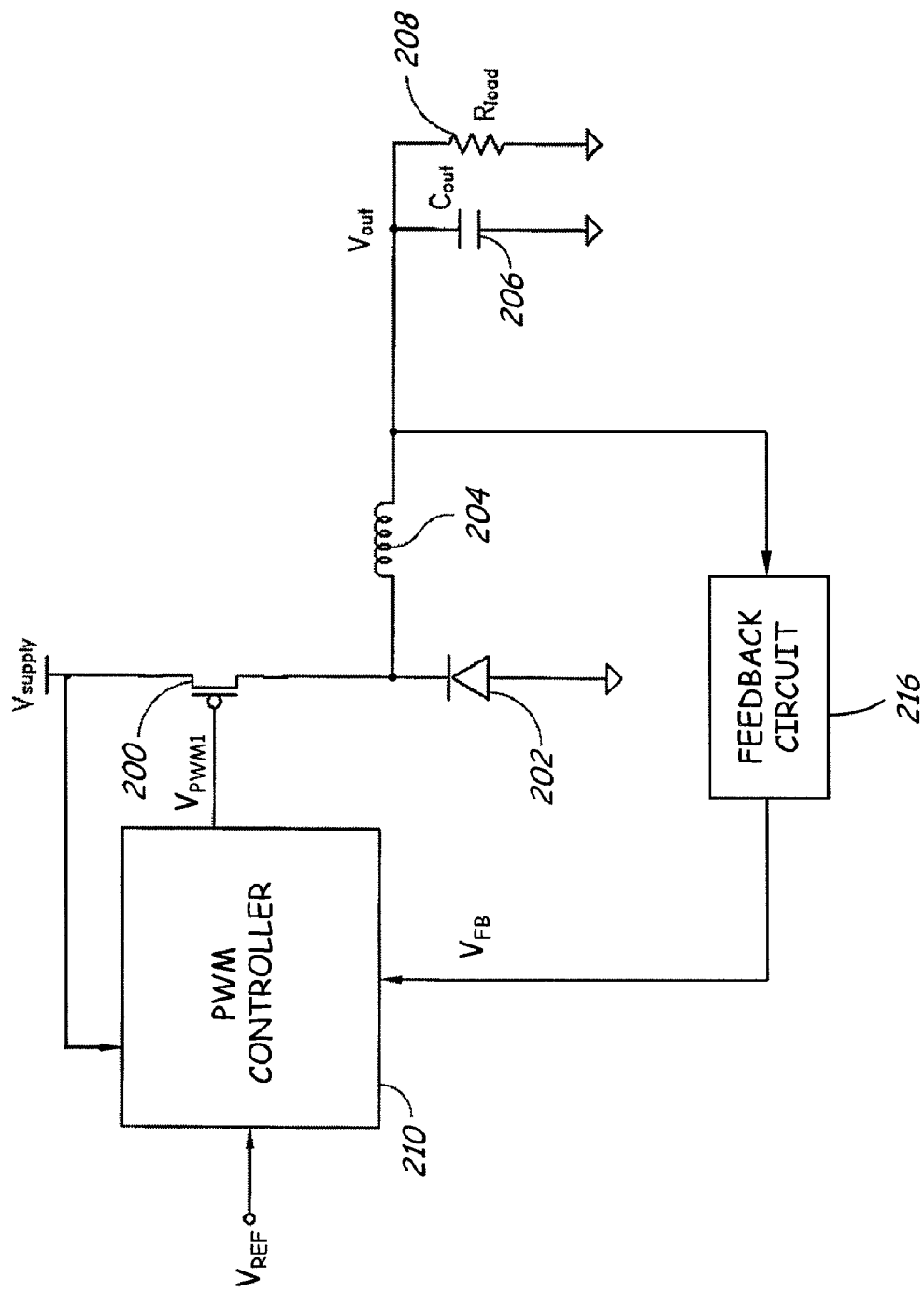
FIG. 2A illustrates one embodiment of a buck converter.
Figure 2B:
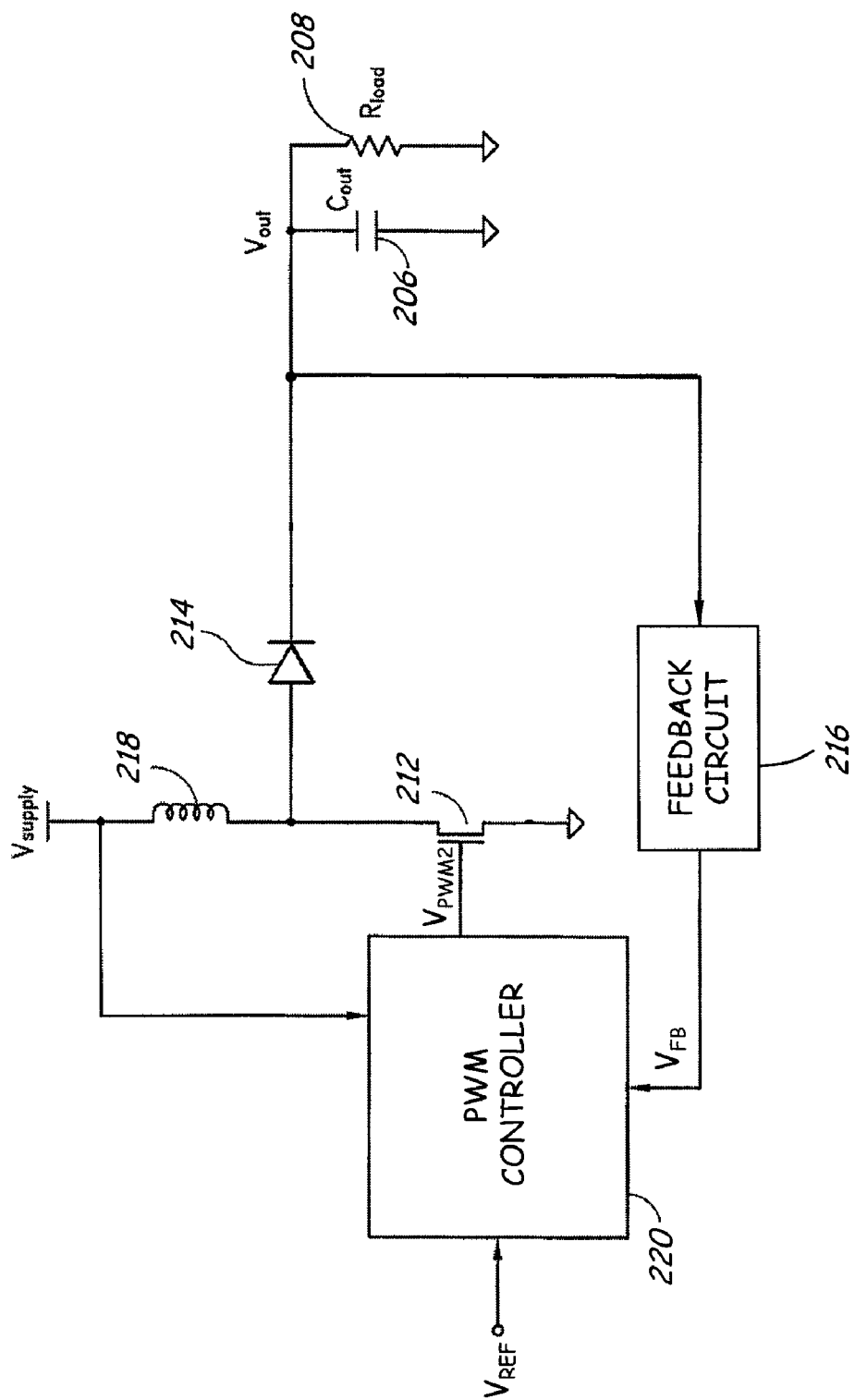
FIG. 2B illustrates one embodiment of a boost converter

FIGS. 2A and 2B illustrate examples of DC-to-DC power converters. In particular, FIG. 2A shows a buck converter and FIG. 2B shows a boost converter. Other types of DC-to-DC converters (e.g., combined buck-boost converters) can also take advantage of the present invention. Referring to FIG. 2A, a buck converter generally provides a regulated DC output voltage ($V_{out}$) with a lower level than a DC supply voltage ($V_{supply}$). In one embodiment, the buck converter includes a first semiconductor switch (or high-side switch) 200 coupled between the DC supply voltage and a first terminal of an inductor 204. A second terminal of the inductor 204 provides the regulated DC output voltage. An output capacitor ($C_{out}$) 206 and an output resistor ($R_{load}$) 208 are coupled in parallel across the regulated DC output voltage to represent a load (e.g., a microprocessor). The output capacitor 206 can also represent filter capacitance used to reduce ripple in the regulated DC output voltage. A diode (e.g., a clamp or freewheeling diode) 202 is coupled between the first terminal of the inductor 204 and a reference terminal (e.g., ground). The diode 202 can alternately be replaced by a second semiconductor switch (or synchronous switch).

A feedback circuit 216 senses the regulated DC output voltage and generates a feedback voltage ($V_{FB}$) for a PWM controller 210. The PWM controller 210 also receives a reference voltage ($V_{REF}$) indicative of a desired level for the regulated DC output voltage. The PWM controller 210 generates a variable pulse-width driving signal ($V_{PWM1}$) to control the high-side switch 200. The level of the regulated DC output voltage depends on the pulse width (or duty cycle) of the driving signal and the DC supply voltage level. The PWM controller 210 varies the pulse width of the driving signal based on a difference between the feedback voltage and the reference voltage. In addition, the PWM controller 210 receives a supply sensed signal indicating the DC supply voltage level and can quickly adjust the pulse width of the driving signal inversely with respect to the supply sensed signal to compensate for variations in the DC supply voltage level.

FIG. 2B has similar components as FIG. 2A, but the components are arranged differently to form the boost converter which provides a regulated DC output voltage having a higher level than a DC supply voltage. For example, an input inductor 218 is coupled between the DC supply voltage and an intermediate node. A semiconductor switch 212 is coupled between the intermediate node and ground. An isolation diode 214 has an anode coupled to the intermediate node and a cathode coupled to the regulated DC output voltage. A PWM controller 220 for the boost converter generates a variable pulse-width driving signal ($V_{PWM2}$) to drive the semiconductor switch 212 and operates in a similar manner as the PWM controller 210 for the buck converter to compensate for variations in the DC supply voltage.

Figure 3A:
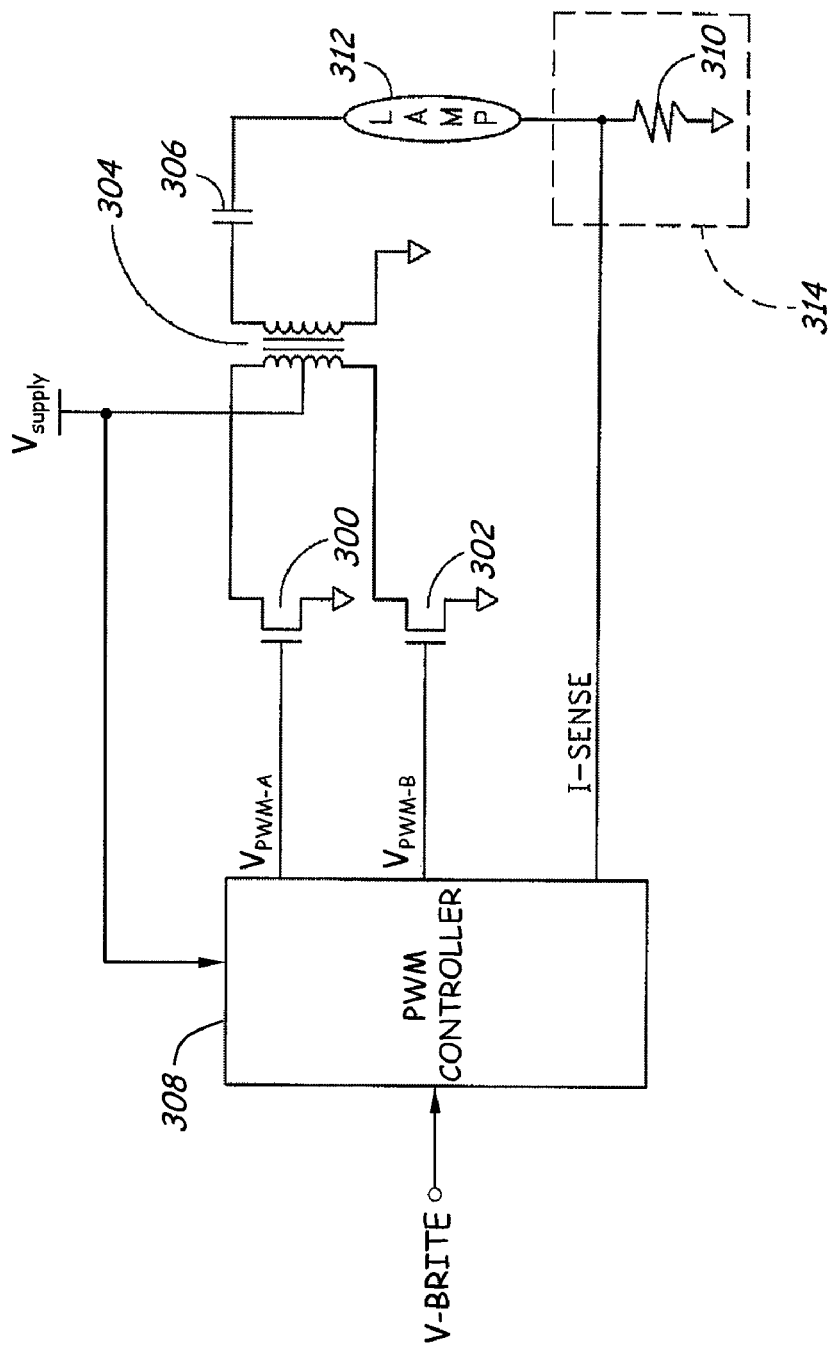
FIG. 3A illustrates one embodiment of a push-pull inverter.
Figure 3B:
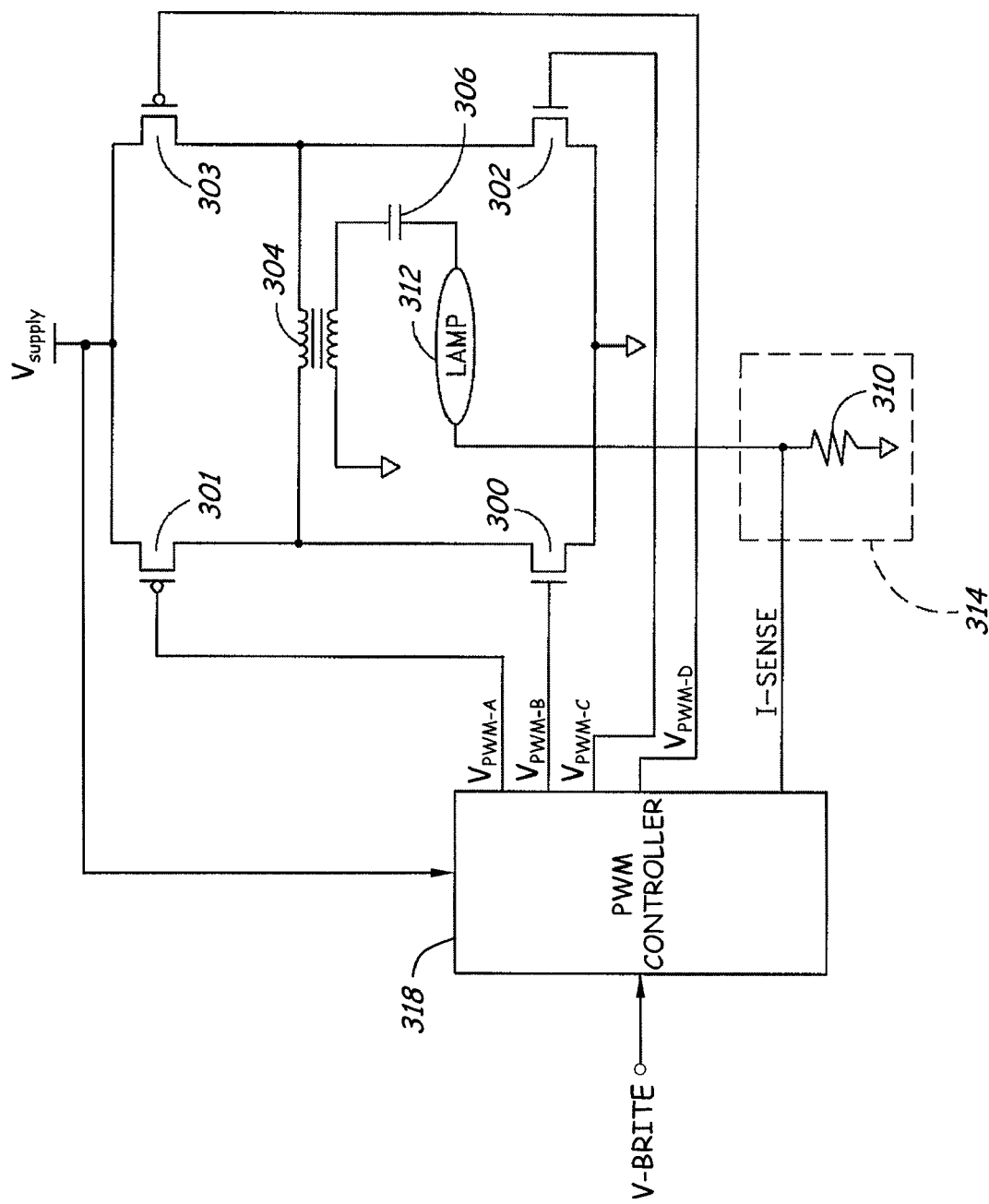
FIG. 3B illustrates one embodiment of a full-bridge inverter.

FIGS. 3A and 3B illustrate examples of inverter topologies used to drive a fluorescent lamp 312. In particular, FIG. 3A shows an inverter using two semiconductor switches 300, 302 in a push-pull topology while FIG. 3B shows an inverter using four semiconductor switches 300, 301, 302, 303 in a full-bridge topology. Other inverter topologies (e.g., half-bridge) with the same or a different number of semiconductor switches can also take advantage of the present invention. For example, both PWM controllers 308, 318 in FIGS. 3A and 3B receive a supply sensed signal indicating a supply voltage level and can quickly adjust a duty cycle associated with driving signals for the semiconductor switches 300, 301, 302, 303 to compensate for variations in the supply voltage.

In one embodiment, an inverter is used to power fluorescent lamps (e.g., CCFLs) in a backlight system and a PWM circuit is part of an inverter controller chip. In some applications, an input power supply voltage to the inverter can change rapidly and randomly in time. For example, a rapid change in input voltage is seen in notebook computers when an AC adapter power supply is "hot plugged." A DC output voltage of the AC adapter is generally higher than a battery voltage to facilitate recharging of the battery and quickly raises a supply rail for a CCFL inverter. In some applications, the supply rail is between 10-15 volts when running on battery and between 18-24 volts when running off an AC adapter output. When the AC adapter is initially plugged in, the supply rail jumps from the battery voltage to the AC adapter output voltage in a fast transient step.

Figure 4:
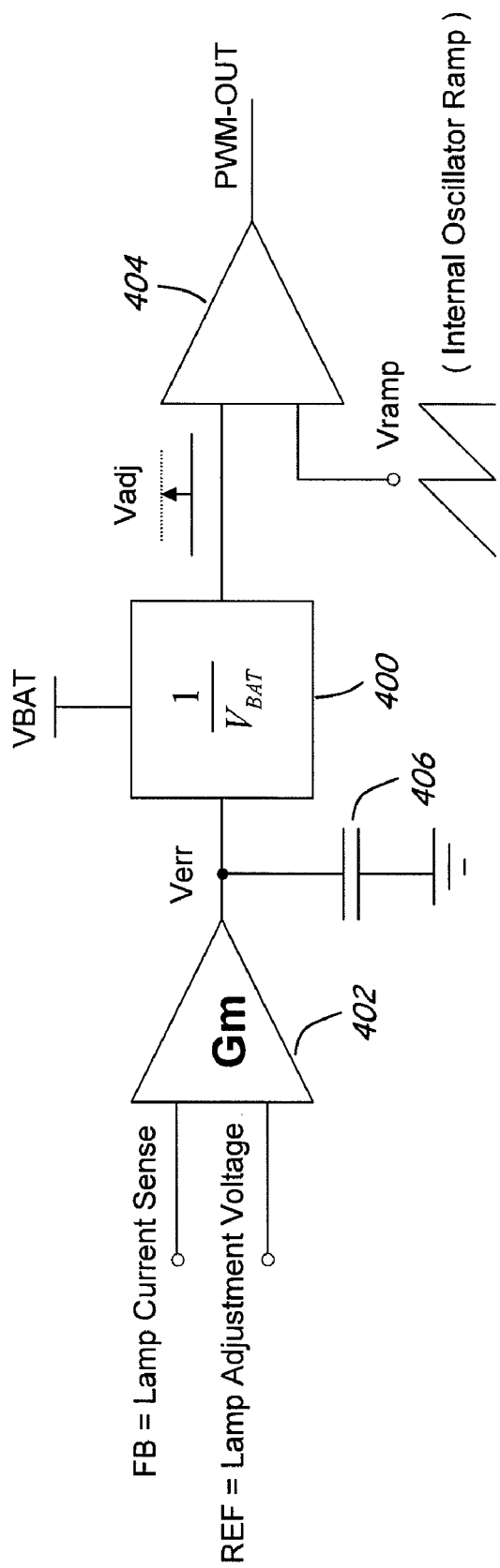
FIG. 4 is a simplified block diagram of one embodiment of a PWM controller with an inverse feed-forward compensation circuit that adjusts an error signal to compensate for supply voltage transients.

FIG. 4 is a simplified block diagram of one embodiment of a PWM controller with an inverse feed-forward compensator 400 to quickly respond to supply voltage transients by inversely adjusting an error signal. In one embodiment, the PWM controller includes a transconductance amplifier (or error amplifier) 402 and a PWM comparator 404. The transconductance amplifier 402 receives a feedback signal (FB) indicative of a load condition (e.g., a lamp current sense in a backlight application) and a reference signal (REF) indicative of a desired or reference load condition (e.g., a lamp adjustment voltage). The transconductance amplifier 402 generates an error signal (e.g., Verr) based on a difference between the feedback signal and the reference signal. A capacitor 406 may be coupled to an output of the transconductance amplifier 402 to generate an error voltage based on a current output of the transconductance amplifier. When the PWM controller is implemented in an integrated circuit (IC) chip, the capacitor 406 is generally an external component coupled to a package pin (e.g., a pin labeled EA_OUT) of the IC chip.

The error voltage is provided to the inverse feed-forward compensator 400. The inverse feed-forward compensator 400 also receives a supply sensed signal (VBAT) indicative of a supply voltage level (or battery voltage) and generates an adjusted error signal (e.g., Vadj) to maintain an approximately constant product of the supply voltage level and a duty cycle (or pulse width) for a PWM output (PWM-OUT) of the PWM comparator 404. For example, the PWM comparator 404 compares the adjusted error signal to a ramp signal (Vramp) generated by a saw tooth oscillator (not shown) to produce the PWM output. In one embodiment, the duty cycle of the PWM output decreases (or increases) with an increase (or a decrease) in the supply voltage by approximately the same percentage to maintain a stable regulated output voltage with reduced overshoots and undershoots for a switching voltage regulator. The PWM output is provided to a driver circuit (not shown) to generate one or more driving signals to control one or more semiconductor switches (e.g., field effect transistors) for the switching voltage regulator. The inverse feed-forward compensator 400 can use offset techniques or translinear principles to adjust the pulse width of the PWM output inversely with respect to changes in the supply voltage and provide substantially instantaneous compensation for supply voltage transients.

Figure 5:
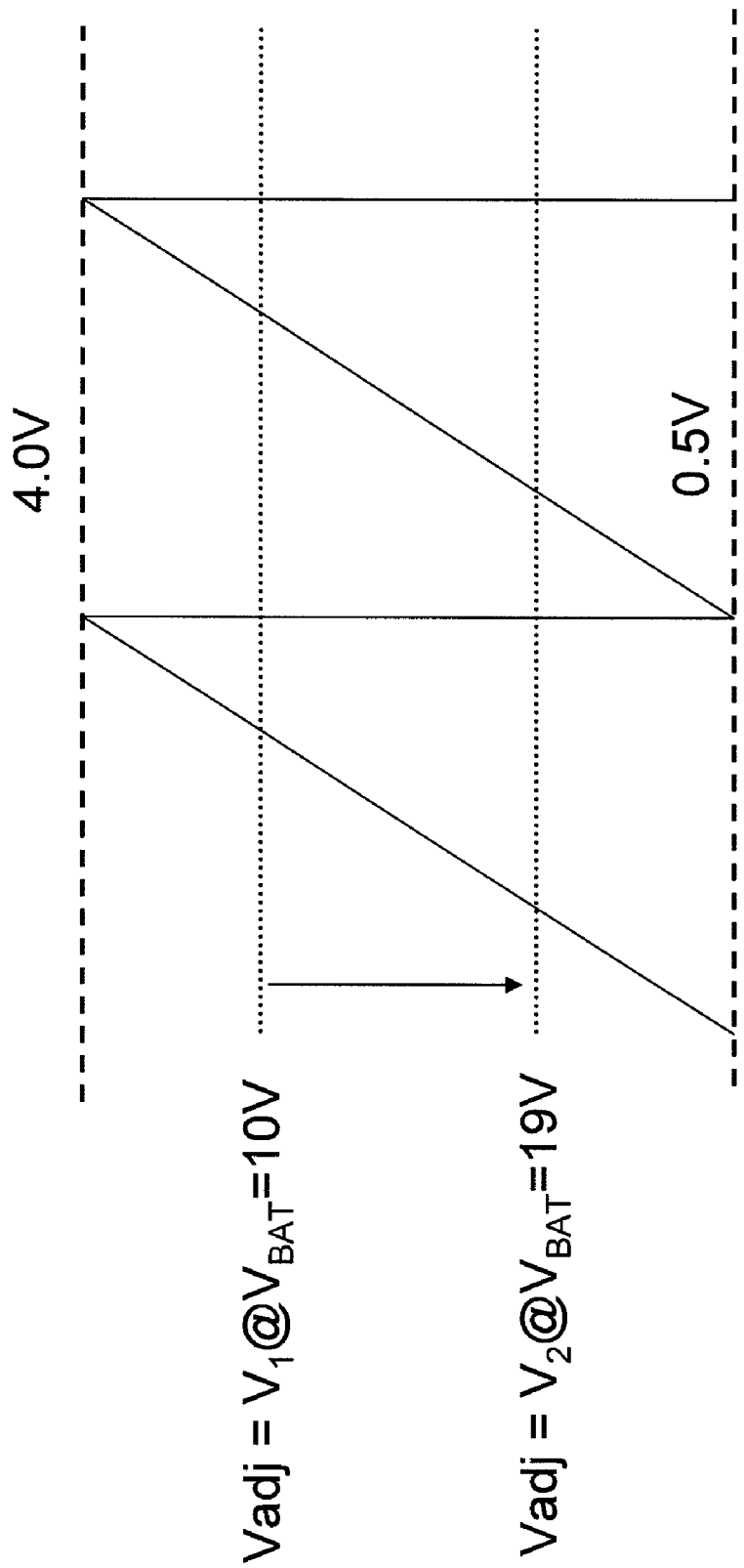
FIG. 5 illustrates one example of how the error signal is adjusted inversely with respect to supply voltage variations in one application.

FIG. 5 illustrates one example of how an error signal is adjusted inversely with a supply voltage (or battery voltage) which can range from 7V to 28V. A saw tooth waveform is shown for reference and represents a ramp signal that ranges from 0.5V to 4.0V at an input of the comparator 404 in FIG. 4. Ramp signals with other amplitudes or peak to peak voltages are also possible with appropriate modifications to the sample equations below. The adjusted error signal at an output of the inverse feed-forward compensator 400 has an initial voltage (e.g., V1) at a first supply voltage (e.g., VBAT1=10V). When the supply voltage changes to a new level (e.g., VBAT2=19V), the adjusted error signal changes to a second voltage (e.g., V2) with the following relationship:

$$V2 = 0.5V + (V1 - 0.5V) \times \frac{VBAT1}{VBAT2}.$$

Example calculations are shown in Table 1 for two different supply voltage levels to further illustrate how the adjusted error signal and the PWM output duty cycle (or pulse width) decrease with increasing supply voltage to maintain an approximately constant product of supply voltage and PWM output duty cycle.

voltage=IBAT×R2). Thus, the offset voltage is combined with the error voltage to generate a compensated PWM control signal (or adjusted error voltage) that advantageously responds quickly to changes in the supply voltage.

With proper selections of resistor values for the resistors R1, R2, transient correction or changing the pulse width (or duty cycle) of an output of the PWM comparator 404 to compensate for changes in the supply voltage can occur instantly. The relatively slower responding error loop that generates the error voltage and ramp generator circuit that generates a ramp voltage (Vramp) are advantageously not part of this transient correction. The output of the error amplifier and the ramp voltage provided to another input of the PWM comparator 404 do not change as quickly as the offset voltage. In one embodiment, the inverse feed-forward compensation circuit described above provides output pulse width compensation within a half periodic cycle of the ramp voltage.

Pulse width correction in a PWM-based voltage regulator is ideally a function of 1/x, where x corresponds to a power supply input voltage. With curve fitting, the above implementation provides acceptable pulse width correction (or is linear) over typical operating power supply input voltage ranges. For example, in a test inverter with the above implementation, a regulated output voltage shows less than 5% overshoot or undershoot in response to line transients of +/−10 volts with transition times of approximately 10 microseconds.

In a PWM-based voltage regulator, an inverse product relationship between a supply voltage and a PWM duty cycle is

TABLE 1

| VBAT1 = 7 V | VBAT2 = 19 V |
|---|---|
| V1 = 4.0 V | $V2 = 0.5\,V + (4.0\,V - 0.5\,V) \times \frac{7\,V}{19\,V} = 1.789\,V$ |
| $Dutycycle\_1 = \frac{4.0\,V - 0.5\,V}{4.0\,V - 0.5\,V} \times 100 = 100\%$ | $Dutycycle\_2 = \frac{1.789\,V - 0.5\,V}{4.0\,V - 0.5\,V} \times 100 = 36.8\%$ |
| VBAT1 × Dutycycle_1 = 7 V × 100% = 7 | VBAT2 × Dutycycle_2 = 19 V × 36.8% = 7 |

Figure 6:
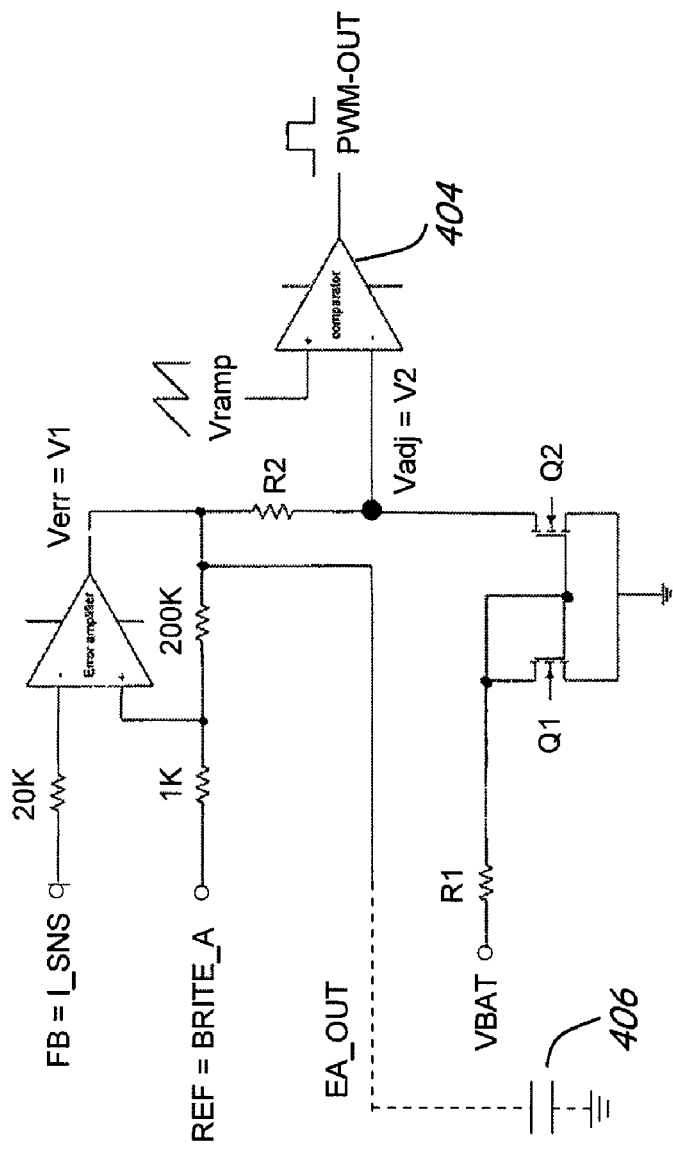
FIG. 6 illustrates one embodiment of an inverse feed-forward compensation circuit that generates an offset signal based on the supply voltage and combines the offset signal with an error signal to adjust a PWM output inversely with respect to the supply voltage.

FIG. 6 illustrates one implementation of a PWM controller with an inverse feed-forward compensation circuit that generates an offset signal based on a supply voltage and combines the offset signal with an error signal to adjust a PWM output inversely with respect to the supply voltage. In one embodiment, the inverse feed-forward compensation circuit comprises a voltage-controlled-current-source (VCCS) that generates an offset current to track supply voltage transients or changes. For example, a resistor R1 coupled between the supply voltage (VBAT) and a current mirror circuit (Q1, Q2) conducts a first current (e.g., IBAT=(VBAT−VGS)/R1) that is proportional to the supply voltage. The current mirror circuit conducts the first current at an input side (e.g., through Q1) and a corresponding second current at an output side (e.g., through Q2). A summing resistor R2 also conducts the second current (or the offset current). The summing resistor R2 is coupled in series between an output of an error amplifier and an input of a PWM comparator 404 without using capacitors which have an inherent delay (e.g., using DC-coupling). A voltage (e.g., Vadj, adjust error voltage or compensated PWM control signal) at the input of the PWM comparator 404 is approximately equal to an error voltage (Verr or original PWM control signal) at the output of the error amplifier minus a voltage drop across the summing resistor R2 (or offset desirable under operating conditions to facilitate a steady regulated output voltage. Some feed-forward correction circuits use complicated circuit designs to implement the inverse product relationship. Some feed-forward correction circuits compromise circuit design complexity for a non-ideal inverse product relationship or require external circuit components. In one embodiment of the present invention, an inverse feed-forward compensator uses translinear principles to implement the inverse product relationship. The inverse feed-forward compensator can advantageously be implemented as part of a PWM controller IC without requiring external components and with no more than one extra package pin to indicate a supply voltage level (or battery input voltage).

Figure 7:
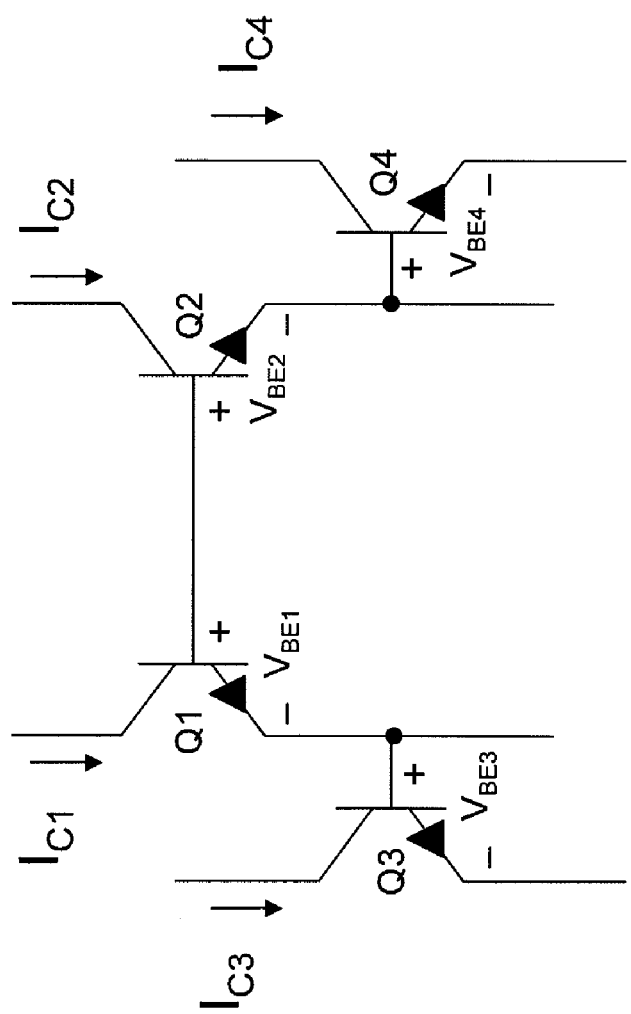
FIG. 7 illustrates a general translinear circuit.

FIG. 7 illustrates a general translinear circuit. For example, four bipolar junction transistors (Q1, Q2, Q3, Q4) are arranged to respectively conduct four collector currents ($I_{C1}$, $I_{C2}$, $I_{C3}$, $I_{C4}$) with their base-emitter voltages ($V_{BE1}$, $V_{BE2}$, $V_{BE3}$, $V_{BE4}$) having the following relationship:

$$V_{BE1} + V_{BE3} - V_{BE2} - V_{BE4} = 0$$

According to the Ebers-Moll model for a bipolar junction transistor (BJT), the base-emitter voltage and the collector current has the following general relationship:

$$I_C = I_S \left( e^{\frac{V_{BE}}{V_T}} - 1 \right) \approx I_S e^{\frac{V_{BE}}{V_T}}. \tag{2}$$

The term "$V_T$" corresponds to a thermal voltage that is approximately equal to kT/q (e.g., approximately 26 mV at a room temperature of about T=300 kelvin). The term "$I_S$" corresponds to a reverse saturation current of a base-emitter diode on the order of $10^{-15}$ to 102 amperes.

Rewriting Equation (1) in terms of the collector currents results in the following equation:

$$\frac{kT}{q} \left[ \ln \frac{I_{C1}}{I_{S1}} + \ln \frac{I_{C3}}{I_{S3}} - \ln \frac{I_{C2}}{I_{S2}} - \ln \frac{I_{C4}}{I_{S4}} \right] = 0. \tag{3}$$

Using algebraic manipulation, Equation (3) can be reduced to show the following relationship between the collector currents:

$$\frac{I_{C1} I_{C3}}{I_{S1} I_{S3}} = \frac{I_{C2} I_{C4}}{I_{S2} I_{S4}}. \tag{4}$$

That is, a product of a first pair of collector currents (e.g., $I_{C1}$ and $I_{C3}$) is proportional to a product of a second pair of collector currents (e.g., $I_{C2}$ and $I_{C4}$) in the general translinear circuit.

Figure 8A:
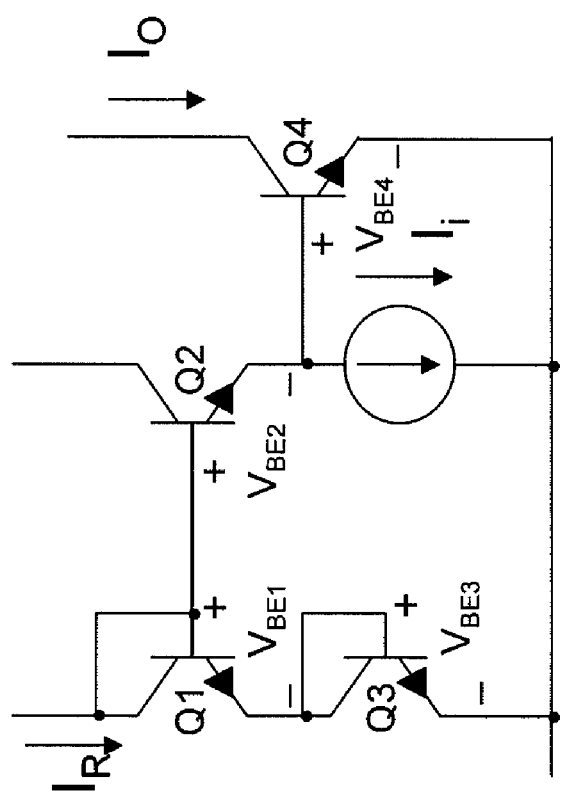
FIGS. 8A and 8B illustrate translinear circuits configured to produce output currents that are inversely proportional to an input converted current or a battery converted current.
Figure 8B:
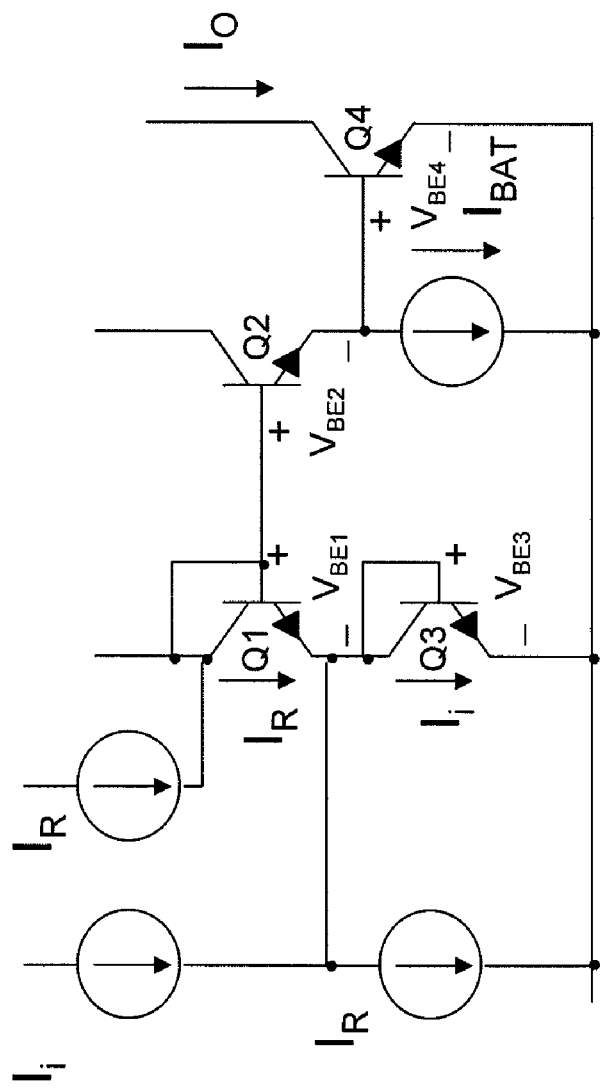

FIGS. 8A and 8B illustrate translinear circuits configured to provide an output current ($I_O$) that is inversely proportional to an input converted current ($I_i$) or a battery converted current ($I_{BAT}$). For example, four transistors (Q1, Q2, Q3, Q4) are arranged in FIG. 8A such that their base-emitter voltages have a relationship as defined by Equation (1) described above. In the arrangement of FIG. 8A, the first and the third transistors (Q1, Q3) have collector terminals coupled to respective base terminals in diode configurations and are coupled in series to conduct a bias (or reference) current (e.g., $I_{C1}=I_{C3}=I_R$). The second transistor (Q2) conducts the input converted current corresponding to a transconductance output. For example, a current source (or current sink) is coupled to an emitter terminal of the second transistor and can generate the input converted current based on a control signal generated by an error amplifier in a PWM controller. The fourth transistor (Q4) conducts the output current. According to Equation (4) and assuming that the transistors have comparable reverse saturation currents, the currents in FIG. 8A have the following relationship:

$$I_O = \frac{I_r^2}{I_i} \tag{5}$$

That is, the output current generated by the translinear circuit of FIG. 8A is proportional to a square of the bias current and inversely proportional to the input converted current.

FIG. 8B shows a substantially similar arrangement of transistors as FIG. 8A and includes additional current sources to generate an output current ($I_O$) that is proportional to an input converted current ($I_i$) and inversely proportional to a battery converter current ($I_{BAT}$). Similar to FIG. 8A, the first transistor (Q1) conducts the bias current ($I_R$) and the fourth transistor (Q4) provides the output current ($I_O$) in FIG. 8B. Unlike FIG. 8A, a current source conducting the input converted current and a current sink conducting the bias current is coupled to a collector terminal of the third transistor (Q3) such that the third transistor conducts the input converted current in FIG. 8B. Unlike FIG. 8A, the second transistor (Q2) conducts the battery converted current in FIG. 8B. For example, the battery converted current is generated by a current source or a current sink that senses the supply voltage (e.g., an output from a battery or an AC adapter) and is proportional to the level of the supply voltage. Accordingly, the currents in the translinear circuit of FIG. 8B have the following relationship:

$$I_O = I_R \frac{I_i}{I_{BAT}}. \tag{6}$$

As discussed above, the input converted current can be derived from a control signal or an error signal generated by an error amplifier and the battery converted current is derived from the supply voltage. The translinear circuit in FIG. 8B is configured to maintain an inverse product relationship between the output current and the battery converted current. That is, the output current is proportional to the input converted current and inversely proportional to the battery converted current. The bias current or reference current is a constant term used to scale the output current. The output current can be provided to a resistor network to produce a voltage (e.g., an adjusted error signal) that is provided to a PWM comparator in the PWM controller.

Figure 9:
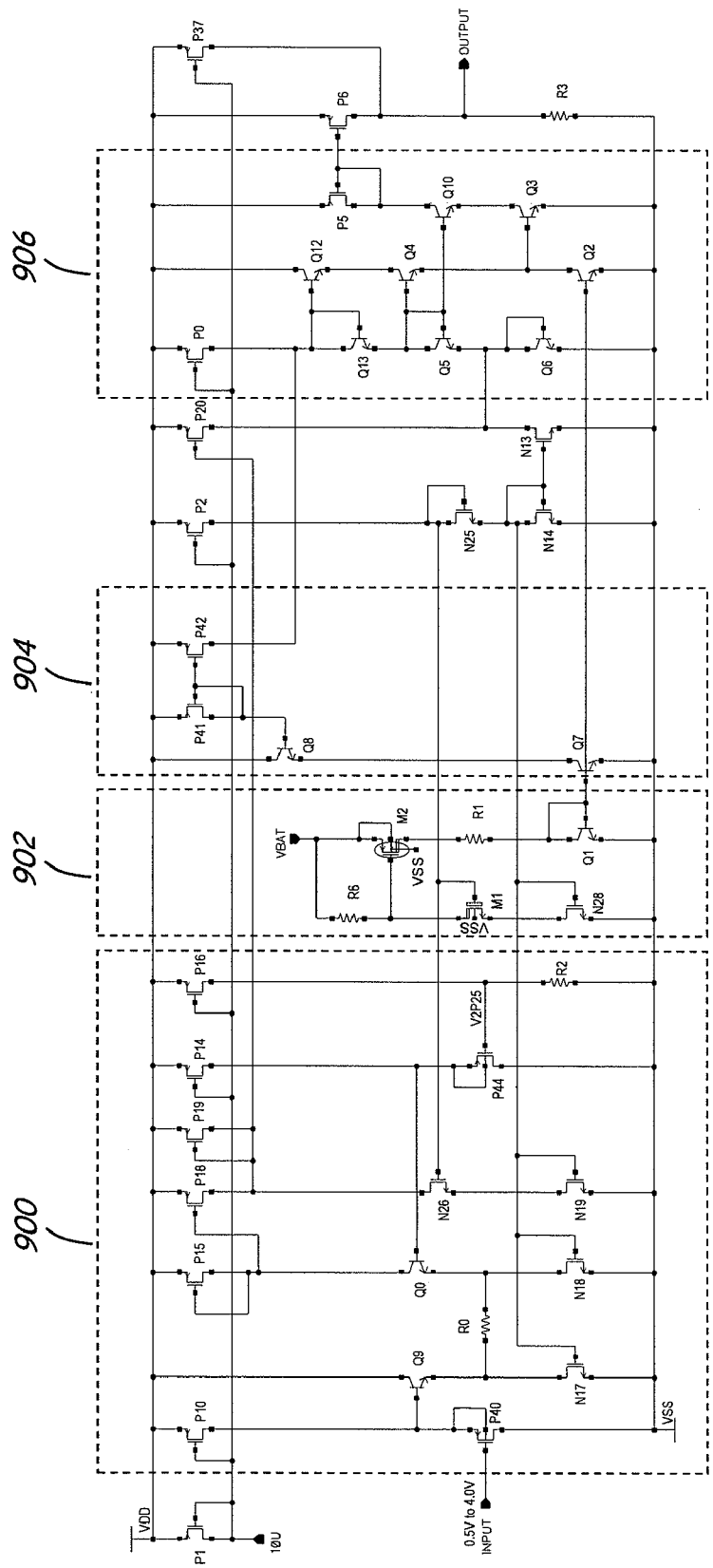
FIG. 9 is a schematic diagram of one embodiment of an inverse feed-forward compensation circuit implemented with a translinear circuit.

FIG. 9 is a schematic diagram of one embodiment of an inverse feed-forward compensator implemented with a translinear circuit 906. The translinear circuit 906 generates an output (e.g., an adjusted error signal for a PWM comparator) based on two currents, a first current corresponding to an input voltage (e.g., an error voltage from an error amplifier) and a second current corresponding to a supply voltage (e.g., VBAT or a battery voltage). In one embodiment, the first current is provided by a first voltage-to-current converter 900 with an input coupled to an output of the error amplifier, and the second current is provided by a second voltage-to-current converter 902 coupled to the supply voltage. In one embodiment, the inverse feed-forward compensator is realized in a BiCMOS process with both bipolar junction transistors and metal oxide semiconductor (MOS) transistors. In the implementation shown in FIG. 9, the inverse feed-forward compensator also includes a circuit network 904 that reduces transistor errors in the translinear circuit 906 as explained below in further detail.

In the first voltage-to-current converter 900, a transistor P40 (e.g., a PMOS transistor) level shifts an input voltage (INPUT) and a transistor P44 level shifts a 2.25V reference voltage (V2P25). In one application, the input voltage corresponds to the error voltage from an error amplifier and is a DC voltage that ranges between 0.5V and 4.0V. The 2.25V reference voltage is a midpoint in the input voltage range. Transistors Q0, Q9, N17, N18 and a resistor R0 convert the input voltage into a corresponding current. For example, a converted current is generated based on a differential voltage between the input voltage and the 2.25V reference voltage. When the input voltage is approximately 0.5V, the differential voltage is approximately −1.75V and the converted current is approximately 20 µA (or a maximum converted current). When the input voltage is approximately 4.0V, the differential voltage is +1.75V and the converted current is approximately 0 μA (or a minimum converted current).

The converted current is mirrored by transistors P15, P18. The current conducted by transistor P18 is compared with a 20 μA current source conducted by transistor N19 and the difference is conducted by transistor P19. This effectively remaps the converted current. That is, the transistor P19 conducts 0 μA when the converted current is 20 μA and conducts 20 μA when the converted current is 0 μA. Remapping the converted current helps to ensure that the transistor Q9 does not saturate when the input voltage is high (e.g., 4.0V). Transistor N26 is a cascode for the transistor N19 current source. The current conducted by the transistor P19 (e.g., the first current or input current corresponding to the input voltage) is mirrored to the translinear circuit 906.

The second current (or VBAT current) that is dependent on the battery voltage is also mirrored to the translinear circuit 906. The second voltage-to-current converter 902 generates the second current based on a difference between the battery voltage, VBE of transistor Q1 and a voltage drop across a resistor R1. The VBAT current is mirrored to the translinear circuit 906 via the transistor Q1 to a transistor Q2. The VBAT current is also mirrored to transistor Q7 which connects to the circuit network 904 to reduce NPN base current errors in the translinear circuit 906.

In one embodiment, a high voltage PMOS switch M2 disconnects the battery voltage in a disabled mode. The M2 switch is turned on or off by a voltage across a resistor R6. When the inverse feed-forward compensator is enabled, a transistor N28 sends a current to the resistor R6 to create a VGS voltage to turn on the M2 switch. When the inverse feed-forward compensator is disabled, the transistor N28 does not conduct current and no voltage develops across the resistor R6 to turn on the M2 switch.

In one embodiment, the NPN base current errors in the translinear circuit 906 are compensated by the circuit network 904 formed by transistors Q7, Q8, P41, P42. The NPN base current errors are dependent on the magnitude of the VBAT current from the second voltage-to-current converter 902. As the VBAT current increases, the NPN base current errors also increase. The VBAT current is mirrored from the transistors Q1 to Q7 and sent to the transistor Q8. The collector current, and thus the base current, of the transistor Q8 changes with (or tracks) the VBAT current. The base of the transistor Q8 is connected to a diode-connected PMOS P41 which is mirrored to the transistor P42. The current conducted by the transistor P42 is delivered to the translinear circuit 906 and used to reduce the base current errors in the translinear circuit 906.

The following description of the translinear circuit 906 correlates the circuits shown in FIGS. 4 and 5. The reference current, $I_R$, is conducted by a transistor P0 and sunk by transistor N13. The battery converted current, $I_{BAT}$, is sunk by a transistor Q2. The input converted current, $I_i$, is sourced by a transistor P20. Some additional transistors are included in FIG. 5 to improve circuit accuracy. For example, transistors Q12, Q13, Q10 are used to match collector to emitter voltages (VCEs) for primary translinear transistors. That is, the transistor Q10 is used to match the VCEs of the primary translinear transistors Q3, Q6. Transistors Q12, Q13 are used to match the VCEs of the primary translinear transistors Q4, Q5. The collector current of the transistor Q10 is the output current, $I_O$, of the translinear circuit 906. The output current is mirrored by transistors P5, P6 and converted to a voltage (e.g., the adjusted error voltage) by a resistor R3.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A controller for a switching voltage regulator that receives a supply voltage and generates an output voltage for a load, the controller comprising:
   an input terminal configured for receiving a feedback signal indicative of an output condition for the switching voltage regulator;
   an error amplifier configured for generating an error signal based on a comparison of the feedback signal to a reference signal, wherein the reference signal indicates a desired output condition for the switching voltage regulator;
   a feed-forward circuit configured to receive the error signal from the error amplifier at a first input terminal that is directly coupled to the error amplifier, and a sensed signal indicative of a supply voltage level at a second input terminal that is directly coupled to the supply voltage, wherein the feed-forward circuit generates at an output an adjusted error signal that has a substantially proportional relationship to the error signal and wherein the adjusted error signal output by the feed-forward circuit increases when the sensed signal indicative of the supply voltage level decreases and decreases when the sensed signal indicative of the supply voltage level increases such that the adjusted error signal is adjusted in relation to said received error signal with a substantially inverse relationship to the sensed supply voltage level; and
   an oscillator configured to generate a periodic ramp voltage whose frequency does not vary based on the adjusted error signal; and
   a pulse-width modulation comparator configured to receive the adjusted error signal from the output of the inverse feed-forward circuit at a first input terminal, and to receive the periodic ramp voltage from the oscillator at a second input terminal that is directly coupled to the oscillator, wherein the pulse-width modulation comparator is configured to generate a pulse-width modulated output signal based on the adjusted error signal and the periodic ramp voltage, wherein a product of the supply voltage level and duty-cycle of the pulse-width modulated output signal is substantially constant for a given reference signal.

2. The controller of claim 1, wherein the switching voltage regulator comprises at least one semiconductor switch and the pulse-width modulated output signal controls the semiconductor switch to maintain a substantially constant output voltage for the switching voltage regulator in response to transients in the supply voltage.

3. The controller of claim 1, wherein the feed-forward circuit comprises:
   a voltage-controlled current source configured to receive the sensed signal indicative of the supply voltage level and to generate an offset current that tracks transients in the supply voltage, wherein the voltage-controlled current source comprises a first resistor and a current mirror circuit; and
   a summing resistor with a first terminal directly coupled to an output of the error amplifier and a second terminal coupled to an output of the voltage-controlled current source, wherein the summing resistor conducts the offset current and the adjusted error signal is provided at the second terminal of the summing resistor.

4. The controller of claim 1, wherein the feed-forward circuit comprises a plurality of transistors arranged in a translinear configuration to conduct at least a first current signal, a second current signal and a third current signal, wherein the first current signal is substantially proportional to a product of the second current signal and the third current signal.

5. The controller of claim 4, wherein the first current signal is derived from the error signal, the second current signal is derived from the sensed signal indicative of the supply voltage level, and the third current signal is used to generate the adjusted error signal.

6. The controller of claim 1, wherein the feed-forward circuit comprises a translinear circuit configured to generate an output current signal based on a first current signal and a second current signal, wherein the output current signal is proportional to the first current signal and inversely proportional to the second current signal, the first current signal corresponds to the error signal generated by the error amplifier, and the second current signal corresponds to the sensed signal indicative of the supply voltage level.

7. The controller of claim 6, wherein the feed-forward circuit further comprises a first voltage-to-current converter configured to generate the first current signal from the error signal and a second voltage-to-current converter configured to generate the second current signal from the sensed signal.

8. The controller of claim 1, wherein the adjusted error signal reflects a change in the supply voltage level within a half periodic cycle of the periodic ramp voltage.

9. The controller of claim 1, wherein the switching voltage regulator is a DC-to-DC power converter with an output voltage level that varies with the duty cycle of the pulse-width modulated output signal, and the feedback signal to the error amplifier indicates the output voltage level of the DC-to-DC power converter.

10. The controller of claim 1, wherein the switching voltage regulator is an inverter with an output voltage amplitude that varies with the duty cycle of the pulse-width modulated output signal, and the feedback signal to the error amplifier indicates current conducted by a load.

11. The controller of claim 10, wherein the inverter controls power in a backlight system, the load comprises at least one cold cathode fluorescent lamp, and the reference signal to the error amplifier determines a brightness level of the cold cathode fluorescent lamp.

12. A method to compensate for variations in a supply voltage level in a voltage regulator, the method comprising:
generating an error signal based on a difference between a feedback signal and a reference signal;
receiving the error signal directly from the error amplifier at a first input terminal of a feed-forward circuit;
sensing a supply voltage level at a second input terminal of the feed-forward circuit that is directly coupled to the supply voltage;
generating an adjusted error signal with the feed-forward circuit based on the received error signal and the sensed supply voltage level, wherein the generated adjusted error signal is proportional to the error signal wherein the adjusted error signal increases when the sensed supply voltage level decreases and decreases when the sensed supply voltage increases such that the adjusted error signal is adjusted in relation to the error signal in a manner that is inversely proportional to the supply voltage level and such that the adjusted error signal is adjusted in relation to said received error signal with a substantially inverse relationship to the sensed supply voltage level;
generating with an oscillator a periodic ramp voltage whose frequency does not vary based on the adjusted error signal; and
generating a pulse-width modulated output signal, using a comparator, based on a comparison of the adjusted error signal to the periodic ramp signal, the periodic ramp signal being received by the comparator directly from the oscillator, wherein a product of the sensed supply voltage level and duty-cycle of the pulse-width modulated output signal is substantially constant for a given reference signal.

13. The method of claim 12, wherein generating the adjusted error signal comprises generating an offset signal that tracks the supply voltage level and combining the offset signal with the error signal to generate the adjusted error signal.

14. The method of claim 12, wherein generating the adjusted error signal comprises:
generating a first current signal that tracks the error signal;
generating a second current signal that tracks the supply voltage level; and
providing the first current signal and the second current signal to a translinear circuit to generate a third current signal that is proportional to the first current signal and inversely proportional to the second current signal, wherein the third current signal is used to generate the adjusted error signal.

15. The method of claim 12, further comprising driving a semiconductor switch with the pulse-width modulated output signal to generate an output voltage for the voltage regulator.

16. The method of claim 12, wherein the voltage regulator is an inverter that controls power to a lamp, the feedback signal indicates a lamp current, and the reference signal indicates a desired brightness level for the lamp.

17. The method of claim 12, wherein the voltage regulator is a DC-to-DC voltage regulator, the feedback signal indicates an output voltage level, and the reference signal indicates a desired output voltage level.

18. A PWM controller comprising:
means for generating an error signal based on a feedback signal and a reference signal;
means for generating an adjusted error signal by receiving the error signal directly from the means for generating an error signal at a first input terminal of the means for generating the adjusted error signal and by receiving a supply voltage level at a second input terminal of the means for generating the adjusted error signal that is directly coupled to the supply voltage, wherein generating the adjusted error signal is based on the error signal and a supply voltage level, wherein the adjusted error signal is proportional to the error signal and wherein the adjusted error signal increases when the supply voltage level decreases and decreases when the supply voltage such that the adjusted error signal is adjusted, by the means for generating an adjusted error signal, in relation to said received error signal with a substantially inverse relationship to the sensed supply voltage level;
means for generating a periodic ramp voltage whose frequency does not vary based on the adjusted error signal; and means for generating a pulse-width modulated output signal with a duty cycle that varies with the adjusted error signal, wherein the means for generating the pulse-width modulated output signal is configured to receive the periodic ramp voltage directly from the means for generating the periodic ramp voltage.

19. The PWM controller of claim 18, wherein the means for generating the adjusted error signal comprises means for generating an offset signal that tracks changes in the supply voltage level and means for combining the offset signal with the error signal.

20. The PWM controller of claim 18, wherein the means for generating the adjusted error signal comprises means for generating a first current signal that tracks the error signal, means for generating a second current signal that tracks the supply voltage level, and means for generating a third current signal that is proportional to the first current signal and inversely proportional to the second current signal.

* * * * *

UNITED STATES PATENT AND TRADEMARK OFFICE
CERTIFICATE OF CORRECTION

PATENT NO. : 7,868,603 B2
APPLICATION NO. : 11/866262
DATED : January 11, 2011
INVENTOR(S) : David K. Lacombe et al.

It is certified that error appears in the above-identified patent and that said Letters Patent is hereby corrected as shown below:

At column 3, line 47, please change "converter" to --converter.--.

At column 4, line 54, please change "discharge)" to --discharge).--.

At column 9, line 11, please change "102" to --$10^{-12}$.--.

At column 9, line 55, after " $I_O = \dfrac{I_R{}^2}{I_i}$ " please insert --.--.

At column 14, line 60, in Claim 18, after "voltage" please insert --increases--.

Signed and Sealed this
Sixteenth Day of August, 2011

David J. Kappos
*Director of the United States Patent and Trademark Office*